United States Patent [19]
Favre

[11] 3,789,666
[45] Feb. 5, 1974

[54] GAS-PRESSURE SENSOR

[76] Inventor: Robert Favre, 5, Chemin du Levant, Lausanne, Switzerland

[22] Filed: July 31, 1972

[21] Appl. No.: 276,435

[30] Foreign Application Priority Data
Aug. 5, 1971 Switzerland.................. 11580/71
July 19, 1972 Switzerland.................. 10781/72

[52] U.S. Cl. ............................ 73/398 R, 73/386
[51] Int. Cl. ........................................... B21d 41/00
[58] Field of Search............ 73/386, 398 R, 387, 410

[56] References Cited
UNITED STATES PATENTS

| | | | |
|---|---|---|---|
| 3,503,263 | 3/1970 | Intraub | 73/386 |
| 3,668,930 | 6/1972 | Strauss | 73/386 |
| 2,838,071 | 6/1958 | Wood | 73/410 |

*Primary Examiner*—Donald O. Woodiel
*Attorney, Agent, or Firm*—Werner W. Kleeman

[57] ABSTRACT

A gas-pressure sensor comprising a mechanical resonator, the resonance frequency of which is closely bound to the pressure to be measured, and an oscillator controlled by the resonator. The mechanical resonator is preferably constructed of two elastic membranes joined together which oscillate in phase opposition and also enclose a hollow interior compartment which communicates with the space whose gas pressure is to be measured. Each membrane is provided with an armature and a permanent magnet of an associated transducer, the transducer includes a stationary coil which is arranged at an electrical current circuit which self-sustains the oscillations with the resonance frequency of the resonator.

12 Claims, 6 Drawing Figures

PATENTED FEB 5 1974 3,789,666

GAS-PRESSURE SENSOR

BACKGROUND OF THE INVENTION

The present invention relates to a new and improved construction of gas-pressure sensor.

In a great many different fields of application, there is a need for a highly accurate gas-pressure sensor which possesses a sufficiently large working range — in certain instances a working range extending from null to several atmospheres absolute pressure — and which is relatively economical. In a particular field of application, such gas-pressure sensor should, for instance, be attached to a meteorological probe which during use oftentimes becomes lost.

In further consideration of the last-mentioned example, it should be indicated that meteorological probes which can be brought to great heights by a balloon should be capable of permitting measurements of the atmospheric pressure with a precision of several ‰, in other words, from a pressure at the region of the ground up to those in the order of magnitude of 1/100 atmospheres. The classical measuring technique while utilizing a deformable aneroid capsule and transmission by means of lever rods, is quite incapable of permitting such accuracies, especially when measuring atmospheric pressures prevailing at great heights.

On the other hand, it is possible to realize mechanical resonators of great stability and to employ such for controlling self-sustaining oscillators by means of transducers and a suitable electrical current circuit. With appropriate construction it is possible to realize that the resonance frequency of such resonator is dependent to a large extent upon gas-pressure, wherein while resorting to the use of additional measures, there can be realized that such is an exact predetermined relationship thereto.

SUMMARY OF THE INVENTION

Hence it is a primary object of the present invention to provide a new and improved construction of gas-pressure sensor which can be utilized with great accuracy over a sufficiently large working range for the most different type technical applications, wherein such gas-pressure sensor possesses a relatively simple and inexpensive construction and notwithstanding same affords good operational reliability.

The inventive gas-pressure sensor is generally manifested by the features that it comprises a mechanical resonator, the resonance frequency of which is in close correlation to the pressure to be measured, and an oscillator is provided which is controlled by the resonator.

BRIEF DESCRIPTION OF THE DRAWINGS

The invention will be better understood and objects other that those set forth above, will become apparent when consideration is given to the following detailed description thereof. Such description makes reference to the annexed drawings wherein.

DETAILED DESCRIPTION OF THE PREFERRED EMBODIMENTS

Figure 1:
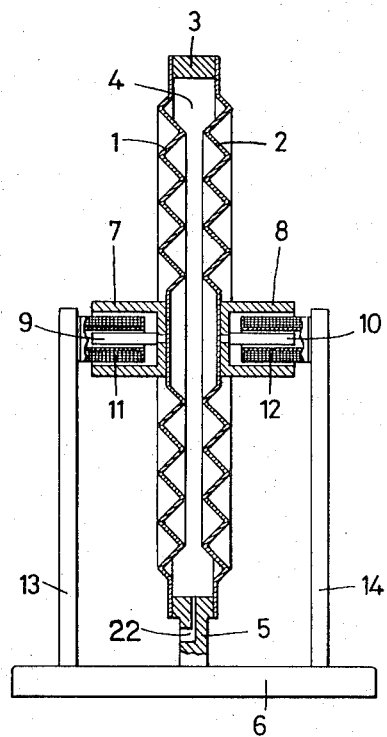
FIG. 1 illustrates a first exemplary embodiment of gas-pressure sensor designed according to the teachings of the present invention, partially in elevational view and partially in vertical sectional view.
Figure 2:
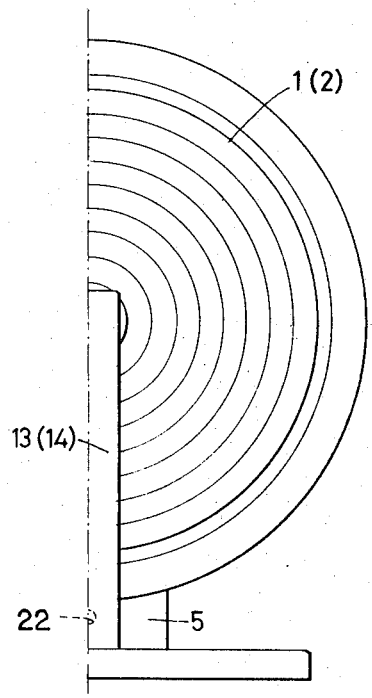
FIG. 2 illustrates in side or end view one-half of the embodiment of gas-pressure sensor depicted in FIG. 1.

Describing now the drawings, in the instrument which has been depicted in FIG. 1, the mechanical resonator essentially consists of elastic membranes or diaphragms 1 and 2 which, viewed from the side or end thereof, are substantially circular-shaped as best seen by referring to FIG. 2 and in profile possess an undulated or serpentine shape, as best seen by referring to FIG. 1. These elastic membranes 1 and 2 are interconnected at their outer edge or periphery by means of a ring 3 in order to enclose a compartment or space 4.

Each of both membranes 1 and 2 is loaded at its center by a mass 7 and 8 respectively functioning as part of a transducer. Both of these masses 7 and 8 are intended to oscillate in phase opposition to one another in order to satisfy the dynamic equilibrium of the thus constructed resonator.

Belonging to the elastic structure of this resonator are on the one hand, the membranes 1 and 2 themselves and, on the other hand, the gas enclosed in the compartment or space 4. The influence of the gas-pressure upon frequency will become that much greater as this last-mentioned elastic component of "pneumatic origin" is greater in relation to the former, which is of "mechanism origin."

Those versed in this particular art are acquainted with the fact that a resonator must be elastically connected with its support if it is desired to eliminate to the maximum possible extent the influence of the properties of the floor carrying the resonator upon the resonance frequency. It is for this reason that in the illustrated instrument there is provided an elastic connection 5 for connecting the resonator with its support or carrier 6.

An electrodynamic transducer of classical construction is composed essentially of the following components:

an armature 7 and 8 respectively formed of soft iron which is movable;

a permanent magnet 9 and 10 respectively which is fixedly connected with the associated armature;

a stationary intermediate coil 11 and 12 respectively which is fixedly connected with a respective support 13 and 14.

An electrical potential which is applied to the outputs of the coil 11 causes an axial force to be exerted upon the membrane 1. Reciprocal hereto this axial movement of the membrane with respect to the support 13 produces an electrical potential at the outputs of the coil 11 according to the well-known laws of electrodynamics.

Since there is supplied to one of the coils the amplified signal which is induced in the other coil, there can be maintained an oscillation with the resonance frequency of the membranes of the resonator.

Turning attention now to FIG. 2, it is to be understood that such depicts in side elevational view one-half of certain elements of the resonator and by referring thereto the analogy of such resonator with an aneroid barometer capsule can be recognized if there is not taken into consideration any auxiliary devices.

Figure 3:
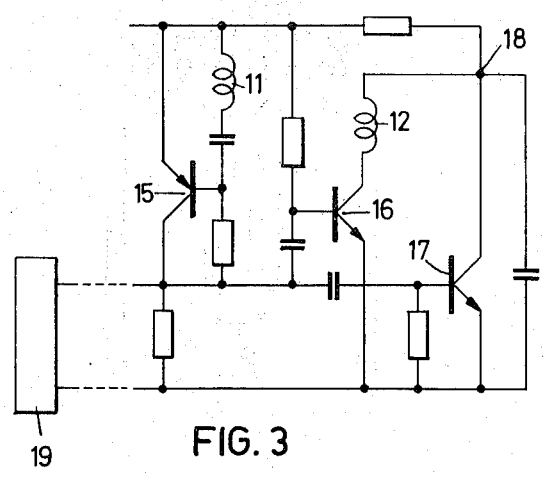
FIG. 3 is a schematic diagram of an exemplary electronic current circuit for maintaining the oscillations and having mechanism for stabilizing the amplitude.

Now in FIG. 3, there is schematically illustrated an exemplary embodiment of electrical current circuit for self-sustaining an oscillation and which is controlled by the resonator of FIGS. 1 and 2. The voltage tapped-off the coil 11 is amplified in a transistor 15 which is designed as an amplifier with negative feedback or counterreaction, then delivered further through a transistor 16 before it again is delivered to the coil 12 which in this instance functions as a "motor" coil. With sufficient amplification and while satisfying the relative phases, the resonator attains a condition of self-sustaining oscillation wherein the membranes 1 and 2 oscillate in phase opposition.

The oscillation amplitude is stabilized by transistor 17. This is predicated upon the fact that as soon as the peak voltage at its base has reached the de-blocking level, the voltage which arrives from junction 18 at the motor coil 12 drops very rapidly so that a stabilization of the amplitude at the region of such condition arises.

Coupled with the current circuit are suitable well-known means 19 which deliver information as a function of the resonance frequency or measure such resonance frequency and, if desired, indicate such resonance frequency which is representative of the gas pressure to be measured.

For their use as meteorological probes for indicating the atmospheric pressure as a function of elevation, the inner compartment 4 of the resonator must only be in flow communication with the ambient air, whereby, however, for preventing considerable dampening of the resonance, it is necessary that such connection, as shown at location 22 of FIGS. 1 and 2, possesses a high aerodynamic resistance. Therefore this connection 22 must consist of a channel of very narrow cross-section or a channel which is plugged with a porous material. Instead of this design it would be, however, possible to provide a channel with a shut-off cock which then would be closed for the period of duration of a measurement.

When using the instrument for measuring a desired pressure, both of the following situations should be taken into account:

in the event that the "dead" volume of the gas-pressure sensor should be maintained very small, then the hollow compartment 4 should per se be subjected to the pressure to be measured which is delivered via the connection channel 22. The membranes then experience a deformation in such a manner that the measured pressure must remain near the ambient pressure.

in the event that the "dead" volume is not of significance, then the gas-pressure measuring instrument or sensor can be encased in an auxiliary housing within which prevails the gas-pressure to be measured, which then acts both from the outside as well as from the inside upon the resonator just as would be the case when measuring atmospheric pressure. It is of course understood that in this case the "dead" volume is greater than in the preceding case, since such of course encompasses the volume of the resonator and that of the auxiliary housing. The measured pressure in this instance can possess any given magnitude.

The calibration curves will be different for both types of constructions and the sensitivity is greater for the second exemplary situation discussed above.

Figure 4:
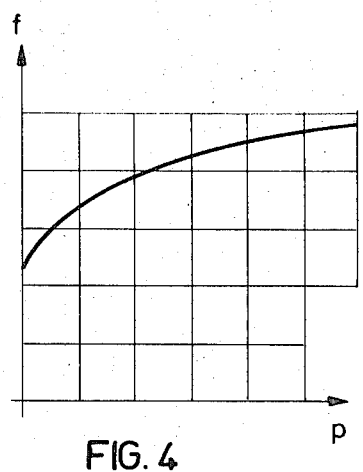
FIG. 4 is a graph depicting a typical relationship between the frequency plotted along the ordinate and the pressure plotted along the abscissa of such graph.

FIG. 4 portrays a typical calibration curve for an embodiment for measuring a pressure which varies between null up to normal atmospheric pressure. One division of the graph along the pressure abscissa scale signifies for instance 150 Torr (mm Hg) and one division along the frequency ordinate scale designates for instance 50 Hz. It should be recognized from this curve that there prevails a sensitivity which increases towards the lower pressures, something which is favorable for the measurement operations.

It should be readily apparent that in the event a gas measuring instrument during operation for instance with meteorological probes is subjected to great temperature fluctuations, then it is necessary to fabricate the membranes 1 and 2 from a thermocompensating alloy; such alloys are commercially available under the trademarks "NIVAROX" "ISOVAL" "DURINVAL" "NI SPAN C," just to mention a few. When maintaining these requirements, the resonance frequency is practically independent of temperature.

In certain cases it can be desired to have the possibility of adjusting the rated resonance frequency of such gas-pressure sensor within narrow limits (less than 1 percent). This can be realized with very sensitive response by applying an external axial magnetic field to the armature of the transducer, this magnetic field being generated by an auxiliary coil which can be furnished with a controllable current. It is also conceivable to act by means of the maintenance phase.

During practical application the situation can arise of desiring to integrate the pressure as a function of time, for instance for the purpose of determining the volume of a gas flowing through a Venturi nozzle. Such use may prevail for instance in medical applications during the determination of the breathing volume (pneumotachograph) or during measurement of pulmonary resilience. The inventive gas-pressure sensor is particularly well suited for use with integration of such a cyclically varying magnitude. In reality, the integral is directly determined by rotation of the oscillation phase of the resonator with regard to a fixed reference frequency, which can be readily ascertained. The means which forms th integral can be any one of the various possible constructional embodiments of means for employing the determined resonance frequency representative of the gas-pressure to be measured.

The inventive gas-pressure sensor directly attains its high precision, stability and simplicity by virtue of the mechanical resonators which in the last few years have found wide dissemination, especially in the field of time measurement, something which is predicated upon the fundamental properties which have been discussed above. Determination of a gas-pressure with a precision of $10^{-3}$, in face $10^{-4}$, can be attained without any problem.

The measurements carried out with a sensor constructed according to FIGS. 1 – 3 of a gas-pressure of only about 100 Torr permitted a disturbance to arise; this corresponds to two different resonance frequencies of the same pressure, wherein also an extremely large dampening occurs. This behavior appears to be predicated upon the fact that with "high" gas-pressure, both membranes 1 and 2 are subjected to a considerable coupling of pneumatic origin, whereas with low gas-pressure the coupling of mechanical origin, which is predicated upon a common support leg or base 5, appears to be dominant.

It has been found that the disturbance effect can be eliminated by direct mechanical coupling which is formed by at least one additional spring which acts upon the central portion of the membranes.

Figure 5:
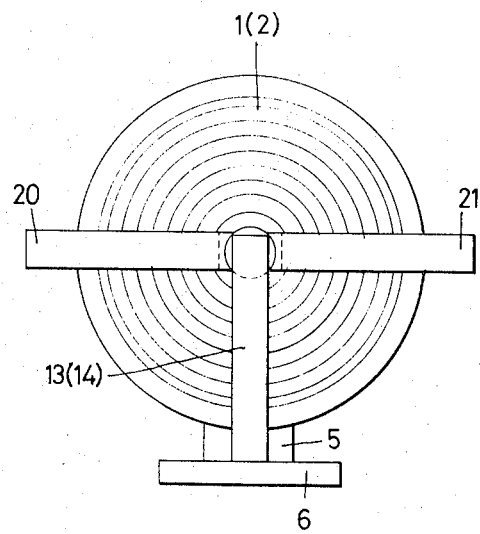
FIG. 5 is a side elevational view of a further embodiment of inventive gas-pressure sensor.
Figure 6:
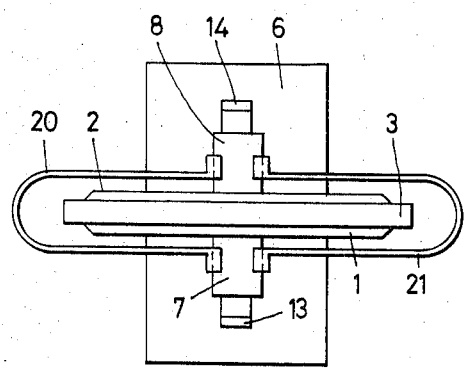
FIG. 6 is a top plan view of the gas-pressure sensor depicted in FIG. 5.

FIGS. 5 and 6 illustrate a variant embodiment of the resonator depicted in FIGS. 1 and 2 wherein two such additional springs are provided. These additional springs have been designated by reference characters 20 and 21 and are designed as substantially U-shaped flexed blade springs, wherein the free ends of the legs of the blade springs are secured to the associated armatures 7 and 8 respectively. The remainder of the resonator is the same construction as that heretofore discussed.

The optimum elasticity constant of the auxiliary springs 20 and 21 has a value which is in the same order of magnitude as that of the membranes 1 and 2.

The auxiliary springs could also possess a different construction and enclosed in the hollow compartment 4. Also with an arrangement in the hollow compartment they could be designed as U-shaped blade springs, or possibly as spiral or coil springs arranged at the axis of the resonator or symmetrically with regard thereto.

This auxiliary spring or springs are indispensable in the event the gas-pressure sensor is employed for gas-pressure values of approximately 100 Torr, as such for instance would be the case with stratospheric probes.

It would be conceivable to e'iminate the disturbance effects by using a resonator with a single membrane which is not dynamically balanced. Then, however, there must be provided at the resonator a very large reactive mass of the support something which is incompatible with the low weight requirements of a meteorological probe.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A gas-pressure sensor comprising a mechanical resonator means, the resonance frequency of which is closely bound to the pressure to be measured, said mechanical resonator means comprises a twin-construction of two elastic membranes which oscillate in phase opposition and encloses a hollow compartment therebetween comparable to the internal compartment of a barometer capsule, oscillator means controlled by said resonator means for oscillating said elastic membranes, and means for exposing said internal compartment to the gas-pressure to be measured comprising a throughpassage having a high aerodynamic resistance so that dampening of the resonance oscillation is extensively reduced.

2. A gas-pressure sensor as defined in claim 1, wherein said mechanical resonator means is constructed such that the gas-pressure to be measured exerts upon the mechanical resonator means an essentially elastic pneumatic oscillation component which with otherwise unchanged perameters is decisive for the resonance frequency.

3. The gas-pressure sensor as defined in claim 1, wherein each of both membranes is provided substantially at its central region with an armature and a permanent magnet of an associated transducer, each said transducer further incorporationg a stationary coil, said coil being arranged at an electrical current circuit which self-sustains the oscillations with the resonance frequency of the resonator.

4. The gas-pressure sensor as defined in claim 1, further including means for elastically connecting the mechanical resonator with a support in such a manner that the resonance frequency is independent of the properties of the supporting area at which bears the support.

5. The gas-pressure sensor as defined in claim 1, wherein the membranes are formed of thermo-compensating alloys so that the resonance frequency is at least approximately independent of ambient temperature.

6. The gas-pressure sensor as defined in claim 1, wherein said hollow compartment is connected with the ambient region by a throughpassage of high aerodynamic resistance and defining said exposing means for rendering possible an equilibrium between the internal pressure and the external pressure while simultaneously limiting or reducing dampening of the resonance oscillation.

7. The pas-pressure sensor as defined in claim 1, wherein the resonator is enclosed in an auxiliary housing within which there prevails the gas-pressure to be measured which thus comes into effect both internally as well as externally of the hollow compartment disposed between the membranes.

8. The gas-pressure sensor as defined in claim 1, wherein the resonance frequency can be rendered easily adjustable by the action of an electrical field generated by a stationary coil at a permanent magnet which participates in the oscillations of the oscillator.

9. The gas-pressure sensor as defined in claim 1, wherein said gas-pressure sensor is designed as an integrator of a cyclically varying or briefly varying pressure as a function of time, characterized by the features of a construction by means of which the integration can be carried out by rotation of the oscillation phase of the resonator with respect to a reference frequency.

10. The gas-pressure sensor as defined in claim 1, wherein the oscillation amplitude of the resonator is stabilized so that it does not essentially vary as a function of the pressure to be measured or the dampening of the resonance.

11. The gas-pressure sensor as defined in claim 1, employed for measuring atmospheric pressures by meteorological probes.

12. A gas-pressure sensor comprising a mechanical resonator means, the resonance frequency of which is closely bound to the pressure to be measured, said mechanical resonator means is constructed such that the gas-pressure to be measured exerts upon the mechanical resonator means an essentially elastic pneumatic oscillation component which with otherwise unchanged perameters is decisive for the resonance frequency, said mechanical resonator means comprises a twin-construction of two elastic membranes which oscillate in phase opposition and encloses a hollow compartment therebetween comparable to the internal compartment of a barometer capsule, oscillator means controlled by said resonator means for oscillating said elastic membranes, and means for exposing said internal compartment to the gas-pressure to be measured, and at least one additional spring is provided which is connected to a central portion of both elastic membranes in the sense of producing an additional mechanical coupling of said membranes.

* * * * *